United States Patent [19]

Sanders

[11] Patent Number: 5,895,058
[45] Date of Patent: *Apr. 20, 1999

[54] LAMINATED GASKET

[75] Inventor: Gary G. Sanders, Rock Falls, Ill.

[73] Assignee: Penberthy, Inc., Prophetstown, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/726,576

[22] Filed: Oct. 8, 1996

[51] Int. Cl.$^6$ ............................................. F16J 15/12
[52] U.S. Cl. ................... 277/650; 277/654; 277/938; 277/944; 220/663
[58] Field of Search ................... 277/227, 650, 277/652, 654, 936, 938, 944; 220/663, 664, 602, 377

[56] References Cited

U.S. PATENT DOCUMENTS

| | | | |
|---|---|---|---|
| 1,637,093 | 7/1927 | Tomlinson | 220/664 |
| 2,527,792 | 10/1950 | Buehler | 220/663 |
| 2,917,924 | 12/1959 | Messick | 220/663 |
| 3,404,061 | 10/1968 | Shane et al. | 428/408 |
| 3,784,212 | 1/1974 | Doerfling . | |
| 3,841,289 | 10/1974 | Meyers . | |
| 3,854,736 | 12/1974 | Farnam | 277/227 |
| 4,234,638 | 11/1980 | Yamazoe et al. . | |
| 4,325,559 | 4/1982 | Czernik et al. . | |
| 4,333,975 | 6/1982 | Booth . | |
| 4,591,166 | 5/1986 | Atkinson et al. | 277/227 |
| 4,656,085 | 4/1987 | Bechen et al. | 277/227 |
| 4,676,515 | 6/1987 | Cobb . | |
| 4,705,278 | 11/1987 | Locacius et al. . | |
| 4,723,783 | 2/1988 | Belter et al. . | |
| 4,822,062 | 4/1989 | Gallo et al. . | |
| 5,172,920 | 12/1992 | Schlenk . | |
| 5,180,631 | 1/1993 | Amano | 277/227 |
| 5,205,569 | 4/1993 | Udagawa et al. . | |
| 5,222,744 | 6/1993 | Dennys . | |
| 5,225,262 | 7/1993 | Leduc . | |
| 5,226,662 | 7/1993 | Justus . | |
| 5,286,574 | 2/1994 | Foster | 277/227 |
| 5,297,806 | 3/1994 | Kestly . | |
| 5,310,198 | 5/1994 | Belter . | |
| 5,330,200 | 7/1994 | Unseth . | |
| 5,421,594 | 6/1995 | Becerra . | |
| 5,437,920 | 8/1995 | Bauer et al. | 277/227 |
| 5,482,014 | 1/1996 | Rosenquist et al. . | |
| 5,551,707 | 9/1996 | Pauley et al. | 277/227 |

FOREIGN PATENT DOCUMENTS

| | | |
|---|---|---|
| 2503671 | 8/1975 | Germany . |
| 2441602 | 4/1976 | Germany . |
| 658418 | 3/1994 | Japan . |
| 6117544 | 4/1994 | Japan . |
| 2146712 | 4/1985 | United Kingdom . |
| 2182985 | 5/1987 | United Kingdom . |

*Primary Examiner*—Daniel G. DePumpo
*Attorney, Agent, or Firm*—Jenner & Block

[57] ABSTRACT

A gasket (20) is provided for sealing a member with a rough micro-surface to a member with a smooth micro-surface. The gasket (20) has a layer (24) of graphite material and a layer (32) of an elastomeric or fibrous gasket material. An inner surface (28) of the graphite layer (24) is laminated to an inner surface (30) of the elastomeric or fibrous layer (32). When used for sealing, the graphite layer (24) is placed adjacent the member with the smooth micro-surface and the elastomeric or fibrous layer (32) is placed adjacent the rougher member. Alternatively, in addition to having a layer (32) bound to an inner surface of the graphite layer (24), a layer (38) of elastomeric or fibrous gasket material may be bound to the outer surface (26) of the graphite layer.

9 Claims, 1 Drawing Sheet

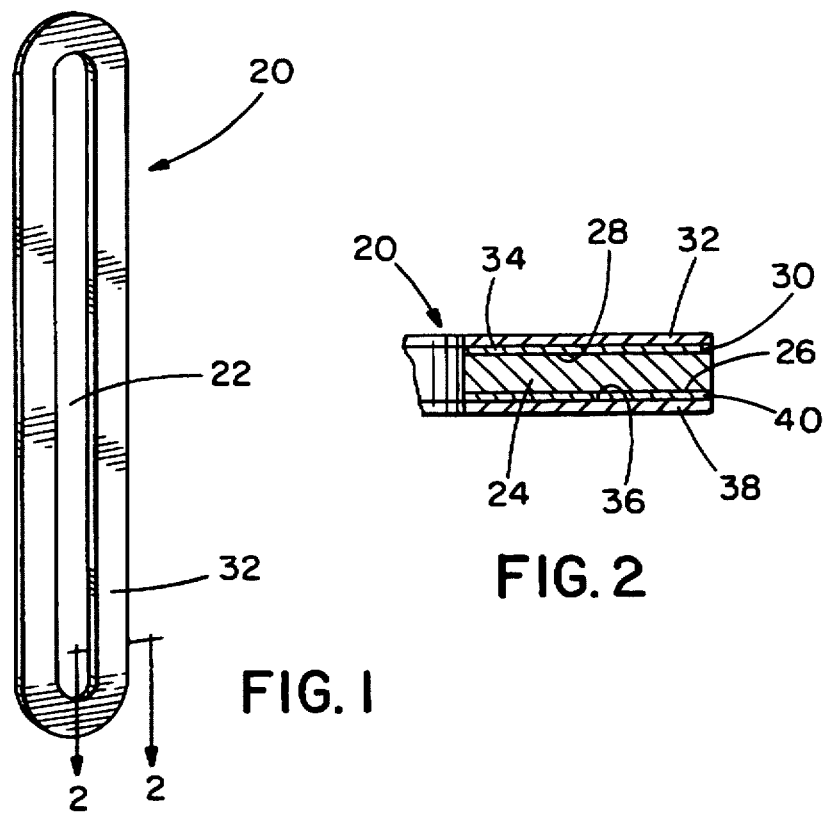
FIG. 1
FIG. 2
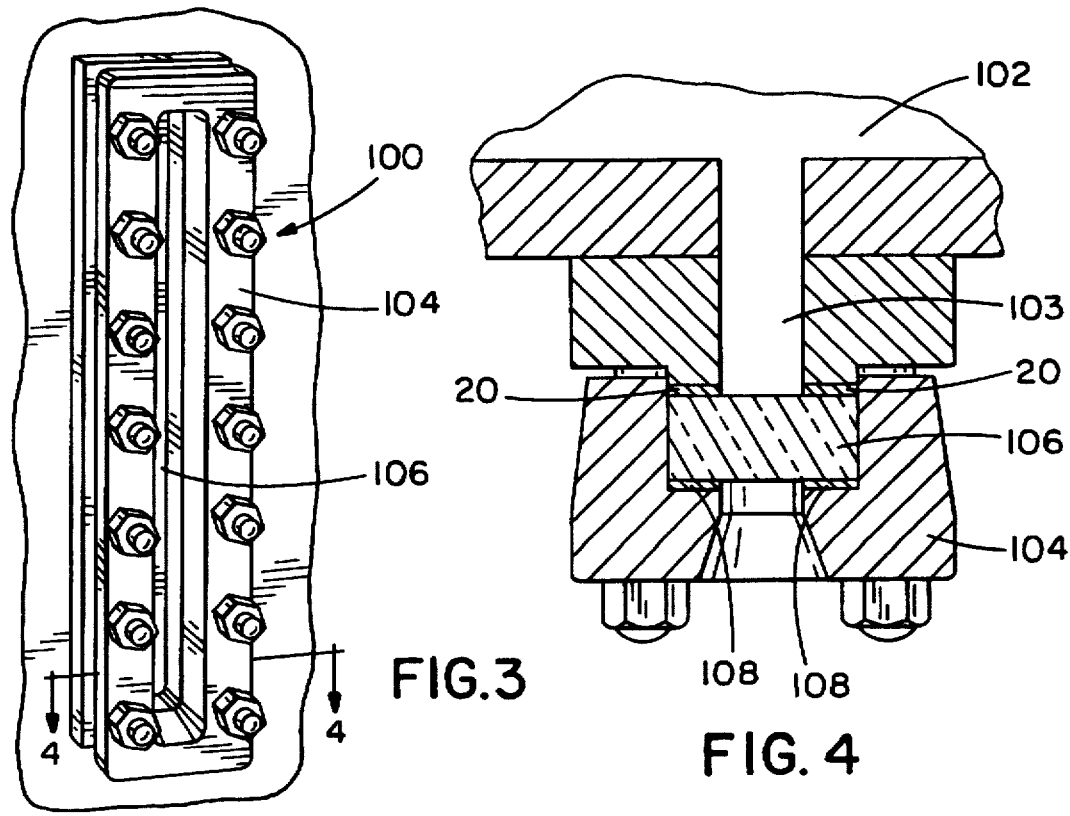
FIG. 3
FIG. 4

LAMINATED GASKET

FIELD OF THE INVENTION

The present invention relates generally to gaskets, and in particular, to gaskets for use in sealing a member with a smooth micro-surface finish to a member with a rough micro-surface finish.

BACKGROUND OF THE INVENTION

Gaskets are well known for use as a replaceable member for sealing areas and passageways between two juxtaposed members. Graphite is commonly used as a gasket material because of its good sealing qualities, low porosity (~$10^{-6}$ Darcys), high chemical resistance and thermal stability.

One problem with the use of graphite as a gasket material is its natural lubricity or low coefficient of friction (initially 0.5 to 0.2 at compression between two 63 AARH steel members). The low coefficient of friction is particularly troublesome when one of the members to be sealed by the gasket has a smooth micro-surface finish, such as glass. For example, a gasket is needed for mounting a reflex or transparent glass member to a metal member for closing a liquid chamber in a liquid level gauge or sight flow indicator. Graphite is highly desirable as a gasket material in these gauges and indicators for its qualities identified above. However, the low coefficient of friction reduces its desirability, because the gasket undesirably moves during assembly, tends to creep under compression, and extrudes under hydrostatic pressure.

Therefore, a need exists for a gasket with sufficient sealing and thermal qualities yet with a sufficiently high coefficient of friction to be used with a member with a smooth micro-surface finish, such as glass.

SUMMARY OF THE INVENTION

In accordance with the present invention, a gasket is provided with excellent sealing and thermal qualities and with a high coefficient of friction. The gasket is formed from a first layer of graphite material. In one embodiment, one surface of the graphite material is bonded to an elastomeric or fibrous gasket material, leaving one exposed graphite surface. When this embodiment is employed between a member having a smooth micro-surface and a metal member, the exposed graphite surface is placed adjacent the member with the smooth micro-surface leaving the elastomeric or fibrous layer adjacent the metal member. In an alternative embodiment, both surfaces of the graphite material are bonded to an elastomeric or fibrous gasket material, providing a surface with a high coefficient of friction adjacent to both members to be sealed.

BRIEF DESCRIPTION OF THE DRAWINGS

FIG. 1 is a perspective view of a laminated gasket in accordance with the present invention;

FIG. 2 is a cross sectional view of the gasket shown in FIG. 1 taken along line 2—2;

FIG. 3 is a perspective view of a liquid level gauge incorporating a gasket in accordance with the present invention; and FIG. 4 is a cross sectional view of the liquid level gauge shown in FIG. 3 taken along line 4—4.

DETAILED DESCRIPTION OF A PREFERRED EMBODIMENT

Referring now to the figures generally, and in particular to FIGS. 1 and 2, a gasket 20 is shown in accordance with the present invention in perspective and cross-sectional views, respectively. Gasket 20 has an opening 22 that is defined in accordance with the application in which the gasket will be used to seal two juxtaposed members. The shape of gasket 20 is also defined and limited only by its application. Gasket 20 has a generally planar configuration.

Gasket 20 has a first layer 24 of graphite material having an outer surface 26 and an inner surface 28. Inner surface 28 is opposite outer surface 26 and is laminated to inner surface 30 of layer 32 of an elastomeric or fibrous gasket material. A thin layer 34 of adhesive is used in bonding graphite layer 24 to layer 32. Laminated to inner surface 26 of graphite layer 24 is inner surface 36 of another layer 38 of elastomeric or fibrous gasket material. Another thin layer 40 of adhesive binds layer 38 of elastomeric or fibrous gasket material to graphite layer 24.

An alternative to the embodiment of the invention shown in FIG. 2 is not to include layer 40 of adhesive and layer 38 of elastomeric or fibrous gasket material, leaving the gasket with an exposed graphite surface. In a typical application where a member with a rough micro-surface, such as a metal member, is to be sealed to a member with a smooth micro-surface, such as a glass member, graphite layer 24 is preferably placed adjacent the smoother member and layer 32 is placed adjacent the rougher member. Thus, the surface of the gasket with the higher coefficient of friction is placed to engage the member with the surface having the higher coefficient of friction. This alternative embodiment is preferred in applications where the gasket will be subjected to pressures less than about 2500 pounds per square inch. In applications where the gasket is subjected to pressure greater than about 2500 pounds per square inch, the embodiment shown in FIG. 2 is preferred.

The graphite layer 24 is desirable for its chemical resistance and thermal stability. The graphite layer 24 is preferably a flexible, high-density grade of sheet graphite material, i.e., graphite ribbon. A suitable graphite material is available from Union Carbide Corporation, and sold as GRAFOILO® Brand Flexible Graphite, grade GTA or GTB.

Layers 32, 38 are desirable primarily for their higher coefficient of friction as compared to graphite layer 24. Layers 32, 38 may be composed of an elastomeric material, such as nitrile butadiene rubber (NBR), also known as Buna-N, styrene butadiene rubber (SBR), also known as Buna-S, chloroprene, or fluorocarbon rubber. The elastomeric material may be formed in place around graphite layer 24. Preferably, layers 32, 38 are composed of a fibrous material with an NBR or SBR binder. Other suitable binders include chloroprene and fluorocarbon rubber. Most preferably, the fibrous material is a non-asbestos, synthetic fiber. A suitable non-asbestos, fibrous gasket material with an SBR binder is available from Lydall Inc. of Connecticut, and sold as NOBESTOS D-7301 gasket material.

Layers 32, 38 and graphite layer 24 may be laminated together using any suitable adhesive and a curing or bonding process at appropriate temperature and pressure. A preferred adhesive is composed of nitrile and phenolic compounds, which are thermoplastic and thermoset polymers, respectively. The laminate may be subjected to a hot rolling press at a temperature and pressure appropriate for the selected adhesive(s). The temperature selected is not critical but must be chosen to sufficiently melt the polymer. The pressure used in bonding affects the density of the graphite layer and the laminate, and thus may be selected as appropriate for the application in which the finished gasket is to be used. A preferred bonding process for laminating the fibrous gasket material to graphite may be obtained from UCAR Carbon Company Inc. of Ohio.

The thickness of gasket 20 in general, and the thicknesses of graphite layer 24 and layers 32, 38 may vary. In particular, the thicknesses of the layers of the gasket may vary based on the pressure to which the gasket will be exposed. It is desirable to have the gasket thickness reduced to decrease, for example, the surface area of the gasket exposed to hydrostatic pressure from a liquid sealed within two members in sealing engagement with the gasket. However, when employed with a glass member, the thickness must be substantial enough to prevent metal surface irregularities from a rough member from telegraphing through the gasket, causing pressure risers on the relatively brittle glass. In a preferred embodiment, where the hydrostatic pressure is up to about 4,000 pounds per square inch, the thickness of the graphite layer is preferably approximately 1/32 of an inch or about 0.031 inches and the thickness of the layer(s) of elastomeric or fibrous gasket material is preferably approximately 1/64, 1/96, or 1/128 of an inch.

FIGS. 3 and 4 show a liquid level gauge incorporating a gasket in accordance with the present invention. Liquid level gauge 100 is primarily for use in industrial applications for observing fluid levels, such as water levels in boilers. Such industrial applications often are characterized by high pressure and high temperatures. Gauge 100 has a liquid chamber 102 for holding the liquid to be measured. Chamber 102 is preferably made of metal such as steel and has an opening 103. Opening 103 is covered by glass 106, which may be reflex or transparent glass. Glass 106 allows the liquid level inside chamber 102 to be visibly observed. Gasket 20 is placed between glass 106 and liquid chamber 102 to seal chamber 102. Glass 106 is held in place by cover 104, which is bolted to gauge 100. Cushion 108 is positioned between glass 106 and cover 104 to protect glass 106. Similar gauges, usually circular, may also be attached to in-line piping in an industrial application.

Described herein is a gasket, which is especially suited for sealing a smooth micro-surface member, such as glass, to a rough micro-surface member, such as steel, although other suitable applications exist. The gasket has a graphite layer and at least one layer of an elastomeric material or a fibrous gasket material. The gasket provides an effective seal with good thermal and chemical resistance qualities and at least one surface with reduced lubricity in comparison to graphite.

While the present invention has been described with respect to specific embodiments thereof, it will be understood that various changes and modifications will be suggested to one skilled in the art and it is intended that the invention encompass such changes and modifications as fall within the scope of the appended claims.

What is claimed is:

1. A gasket in combination with a member with a smooth micro-surface and a member with a rough micro-surface, comprising:

a gasket with a first layer of graphite ribbon material and a second layer of fibrous gasket material bound to said first layer, said first layer being positioned adjacent said smooth micro-surface and said second layer being positioned adjacent said rough micro-surface; and wherein the surface roughness of the rough micro-surface is characteristic of a machined surface and the surface roughness of the smooth micro-surface is characteristic of a polished surface.

2. The combination of claim 1 wherein said first layer of graphite material is from 0.031 to 0.063 inches thick.

3. The combination of claim 1 wherein said second layer of material is from 0.0156 to 0.0078 inches thick.

4. The combination of claim 1 wherein said second layer is comprised of fibrous materials with a nitrile butadiene rubber binder.

5. The combination of claim 1 wherein said second layer is comprised of fibrous materials with a styrene butadiene rubber binder.

6. The combination of claim 1 wherein said second layer is comprised of fibrous materials with a chloroprene binder.

7. The combination of claim 1 wherein said second layer of fibrous material is comprised of fibrous materials with a fluorocarbon rubber binder.

8. The combination of claim 1 wherein said smooth micro-surface is a glass surface.

9. The combination of claim 1 wherein said rough micro-surface is a metal surface.

* * * * *